United States Patent [19]

Schwartz

[11] 4,085,611
[45] Apr. 25, 1978

[54] RECORDING COMPRESSION TESTING METER

[75] Inventor: Edwin L. Schwartz, Los Angeles, Calif.

[73] Assignee: Rite Autotronics Corporation, Los Angeles, Calif.

[21] Appl. No.: 809,638

[22] Filed: Jun. 24, 1977

[51] Int. Cl.² ............................................. G01M 15/00
[52] U.S. Cl. .......................................... 73/115; 73/712; 346/4
[58] Field of Search .................. 73/391, 115, 120, 419; 346/3, 4, 145

[56] References Cited

FOREIGN PATENT DOCUMENTS 889,078  11/1977  Germany ................................ 346/3

Primary Examiner—Donald O. Woodiel
Attorney, Agent, or Firm—Robert E. Geauque

[57] ABSTRACT

A recording compression testing meter having a measuring cylinder connected to the spark-plug hole of an engine cylinder by means of a tube and having an indicator arm movable by the piston of the measuring cylinder over a portion of recording paper fed from a roll of paper carried in a removable cartridge, the paper being fed from the roll by a drive mechanism carried by the cartridge so that tests of a large number of cylinders can be recorded on the continuous sheet of recording paper fed from the paper roll before it is necessary to reload the meter and the test of the cylinders of each engine can be torn off and stored separately.

12 Claims, 12 Drawing Figures

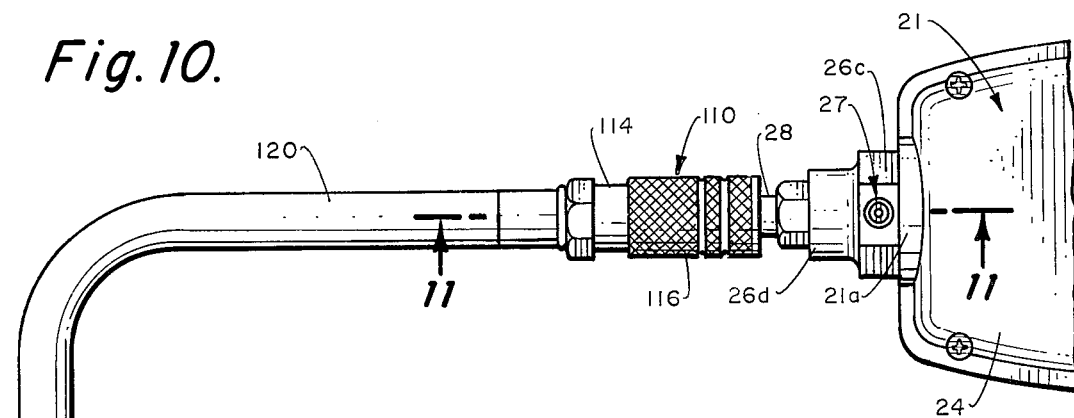
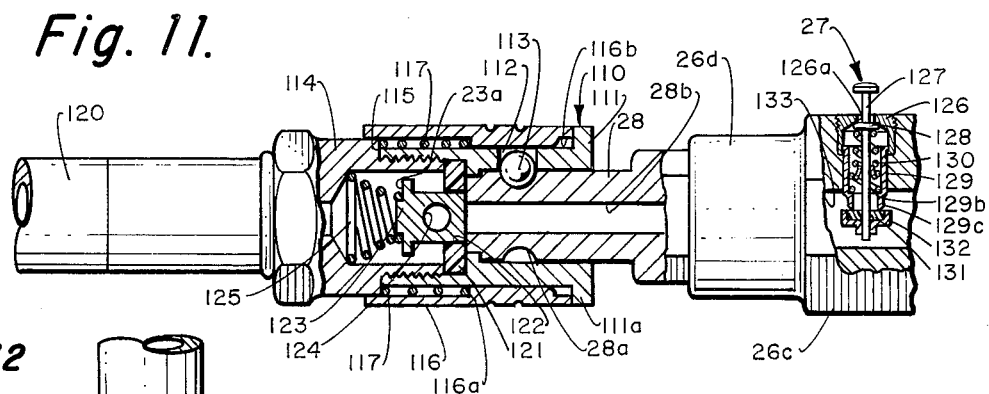
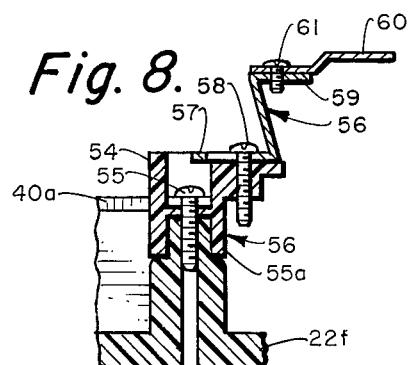
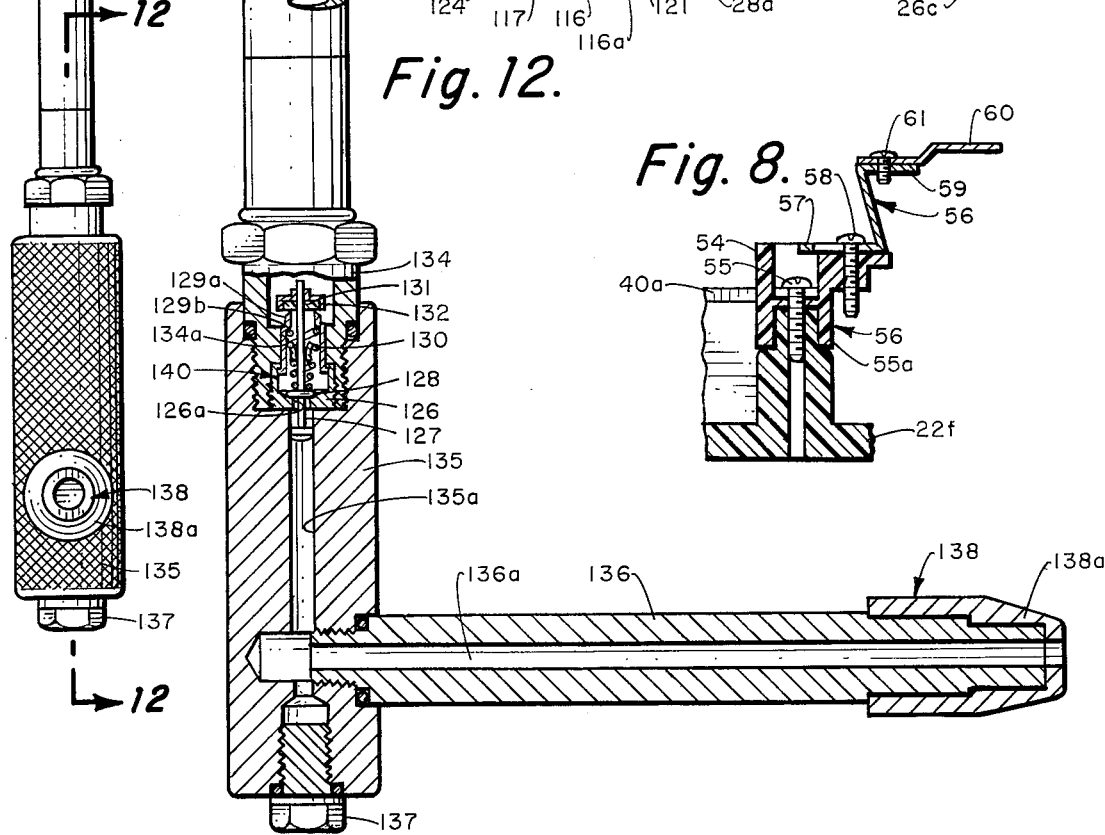

RECORDING COMPRESSION TESTING METER

BACKGROUND OF THE INVENTION

In determining the condition of an internal combustion engine, it is important among other things to determine the condition of the piston rings by determining how tightly the piston rings fit against the cylinder wall. A measure of the condition of the piston rings can be obtained by measuring the pressure produced in the combustion chamber after several compression strokes of the piston. The greater the pressure obtained with a given number of compression strokes of the piston, the better the condition of the rings.

In order to obtain a measure of the compression pressure produced by the piston, it has been customary to remove the spark plug from the cylinder and insert a tightly fitting probe which senses the pressure within the cylinder. This probe communicates the pressure in the cylinder to a pressure measuring device which can indicate the pressure on a dial or make a record of the pressure. In one device, a dial indicator arm moves a marking pin over a card to mark the card and indicate the pressure in the cylinder. Each time a test is completed for a particular engine, it is necessary to change the card in the device before testing the next engine. This procedure is time consuming and it is not possible to record the pressures developed on more than one engine on a given card for comparison with other engines. One type of pressure measuring device consists of a cylinder containing a piston with sealing rings. The rings produce considerable friction against a cylinder wall which interferes with the sensitivity of the device. In another case, the pressure sensitive device consists of a bourdon type tube in which the pressure indicating arm is connected to one end of the tube and the arm moves a linkage to position a pointer. The bourdon tube is awkward to handle and does not provide a compact measuring device which can be held in the hand of the operator while making measurements in the vicinity of the engine.

SUMMARY OF THE INVENTION

The present invention provides a compact recording compression tester which consists of a casing to which is attached a handle containing a switch for the starter. A pressure measuring cylinder is located within the casing and is connected to a pressure tube leading to the engine cylinder to be tested. A measuring piston is located within the measuring cylinder and is separated from the cylinder by a roll diaphragm which permits the piston to move relative to the cylinder while maintaining a completely effective seal. The piston moves against a spring located between the piston and the end of the cylinder in response to a change in pressure and the roll diaphragm produces very little friction resistance to this movement.

The piston drives an indicator arm over a sheet of pressure sensitive paper which is part of a roll of paper located within a removable cartridge. The roll of recording paper can be moved by an exterior knob and the paper carries a series of scales along its length which can be moved into the proper position for recording the test of successive cylinders. During the standard testing of an engine cylinder to obtain the compression pressure, the engine is cranked over three consecutive times past its top dead center.

The tube leading to the instrument contains a pressure cutoff device in order to trap the air resulting in the line resulting from each compression stroke of the piston. A pressure relief valve is located in the casing so that all pressure in the line can be removed when it is desired to start the compression measurement on a new cylinder.

The present invention provides a compact device having a switch in a pistol-grip handle to control the movement of the engine and the measuring device consists of a pressure sensitive piston driving a pointer over a continuous roll of recording paper. Since a continuous roll of paper is used for the recording, a cylinder can be tested and the paper then rolled ahead to provide a new portion of the paper for the testing of the next cylinder. After all cylinders have been tested, the paper can be torn off to provide a permanent comparative test of all cylinders which have been tested. The paper roll is mounted on a removable end cartridge located in the instrument casing so that a new paper roll can be inserted into the instrument by simply pulling out the cartridge, replacing the roll and then reinserting the cartridge. By housing all of the elements of the pressure measuring device and the switch in a single casing, the instrument is easily operated in the vicinity of the engine.

BRIEF DESCRIPTION OF THE DRAWINGS

FIG. 8 is a vertical section along line 8—8 of FIG. 6 showing the linkage for the indicator arm;

FIG. 10 is an elevational view of the tube connected to the measuring cylinder;

FIG. 11 is a section along line 11—11 of FIG. 10 showing the quick disconnect and the pressure relief valve; and FIG. 12 is a section along line 12—12 of FIG. 10 showing the probe for insertion into the spark-plug hole and the pressure cutoff valve in the probe.

BRIEF DESCRIPTION OF THE SHOWN EMBODIMENT

Figure 1:
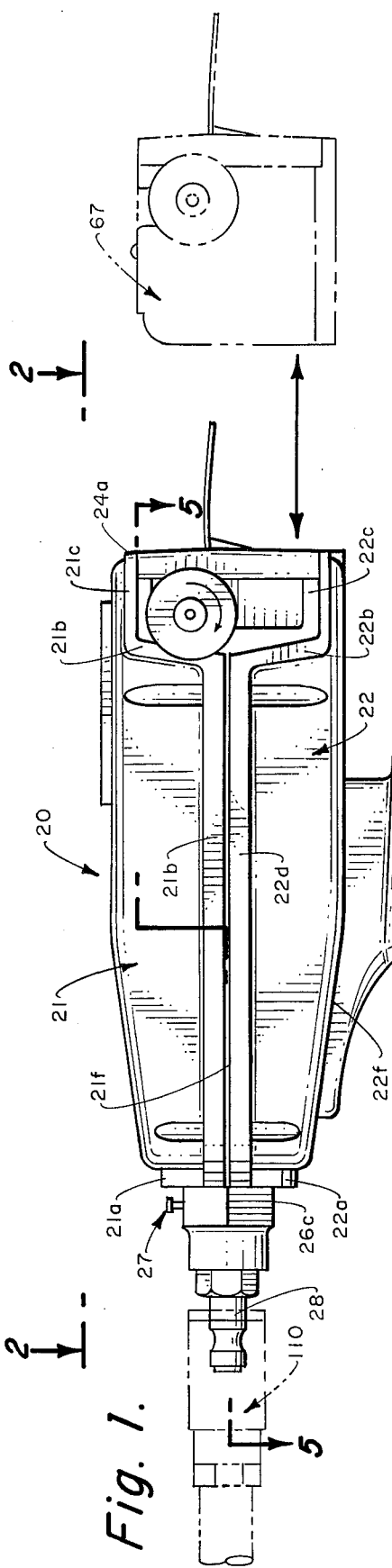
FIG. 1 is a side elevational view of the recording compression testing meter showing in phanthom lines the paper roll cartridge removed from the casing and the pressure tube attached to the casing.

Referring to FIG. 1, the recording compression testing meter 20 consists of an upper casing section 21 and a lower casing section 22. The casing section 21 has a curved end portion 21a and recessed edge portions 21b and 21c on each side. A horizontal edge 21d has a lip 21f around the section 21 which is inserted into an edge groove in casing section 22. Casing section 22 also has a curved end portion 22a and recessed edge portions 22b and 22c on each side connected with the horizontal edge 22d. End recesses in the sides are formed by edges 21b, 21c, 22b and 22c. Also, section 22 has a bottom panel 22f. The casing section 21 has a top panel 24 which has a rearward edge 24a at the termination of side edge portion 21c and extends to the forward curved edge 21a (See FIG. 2). The top panel contains a cutout 25 containing a plastic window 23 through which can be observed the interior of the testing meter.

Located within the two casing sections is a pressure measuring cylinder 26 which has end portions 26a and 26b which are received within cutouts within end portions 21a and 22a. Portion 26b connects with housing portion 26c which contains relief valve 27. Portion 26c, in turn, connects with portion 26d which mounts the fitting 28 for the pressure tube. The cylinder 26 and the portion 26a have flanges 29 and 29a which are clamped together by screws 29c after the edge of a roll diaphragm is located therebetween as will be later explained.

Figure 3:
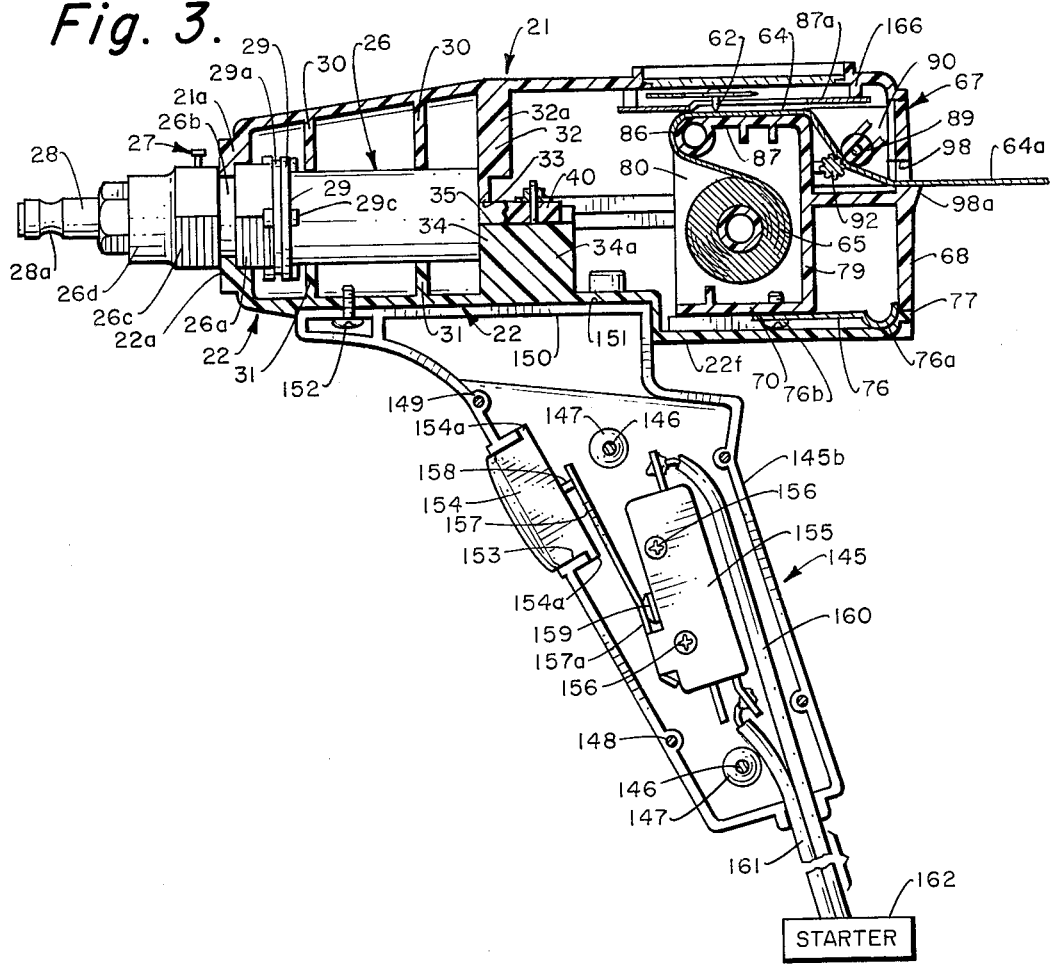
FIG. 3 is a vertical section along line 3—3 of FIG. 2 showing the pressure measuring cylinder and the recording paper extending from the paper roll within the cartridge.

The pressure measuring cylinder 26 is supported by partitions 30 in the top casing section 21 and by partitions 31 in the lower casing section 22 (see FIG. 3). Casing section 21 also contains a partition 32 which, at its central location, includes reinforcing flanges 32a. The lower edge of the flange 32 contains a notch 33.

Casing section 22 contains a partition 34 which has a plurality of reinforcements 34a at a central location and also a notch 35. The casing section 22 also contains partitions 39 and 39a for supporting the cylinder 26 (see FIG. 5) and opposite partitions (not shown) are contained in the upper casing section 21.

A piston rod 40 has end 40a extending through the notches 33 and 35 in the partitions 32 and 34 and the end is supported by the reinforcements 34a for sliding movement in the notches. The piston rod is connected at the other end 40b to a piston head 42 and rolling diaphragm 44 is positioned between the piston head and cap 45. The edge of the diaphragm is clamped between the flanges 29 and 29a by means of the screws 29c. Cap 45 is held against the roll diaphragm by means of a screw 46 which passes through the diaphragm 44 and the piston head 42 into the end 40b of the rod 40. A coil spring 48 surrounds the piston rod 40 and has an end adjacent piston head 42 and the other end adjacent the end of cylinder 26.

Figure 5:
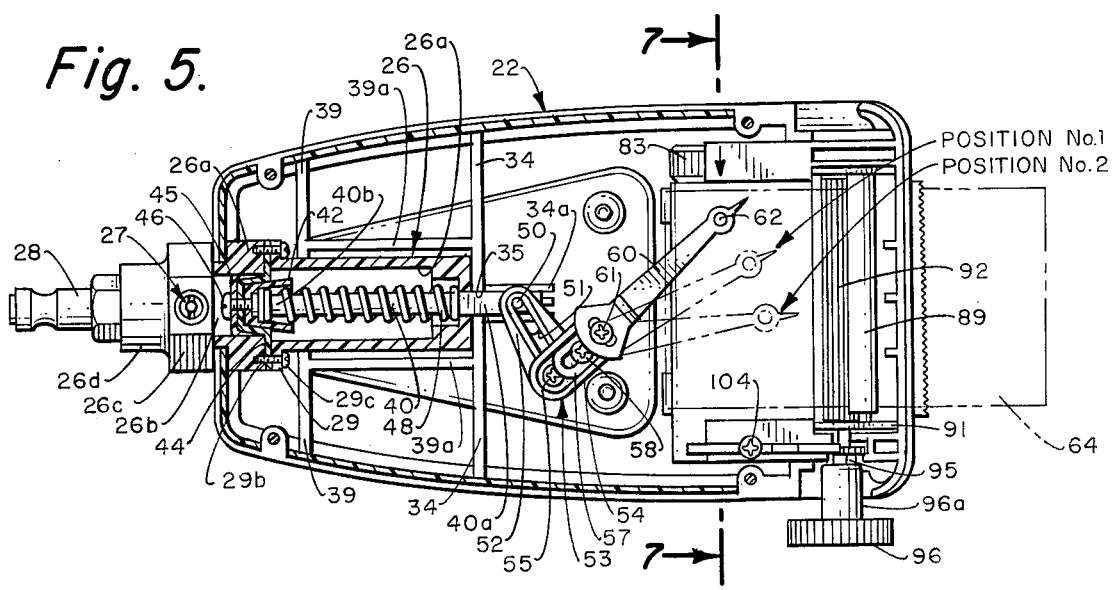
FIG. 5 is a horizontal section along line 5—5 of FIG. 1 illustrating the pressure measuring cylinder and the indicator arm located over the recording paper at the zero pressure position.

Thus, the piston head 42 is sealed against leakage past internal surface 26a of the cylinder 26 by means of the rolling diaphragm which moves with the piston head 42 as the piston head moves in the cylinder 26. In FIG. 5, the piston head is shown in the unpressurized position with spring 48 fully extended while in FIG. 6 the piston rod is shown in its maximum pressure position with spring 48 compressed.

The end 40a of piston rod 40 carries a pin 50 which extends into a groove 51 in arm 52 of a crank 53. The other arm 54 of the crank is above the arm 52 and the crank 53 is supported for rotation by pin 55 connected to a projection 55a on the casing section 22 (see FIG. 8). A Z-shaped indicator arm 56 has a lower foot 57 secured to arm 54 by screw 58 and an upper foot 59 secured to indicator arm 60 by screw 61. The indicator arm 60 carries a marking pin 62 which bears against the recording paper 64 which has been unwound from paper roll 65. Movement of piston head 42 and rod 40 causes the crank arm 53 to rotate about the pin 55 and causes movement of pin 62 of indicator arm 60 back and forth along the path 63 (see FIG. 6).

Figure 4:
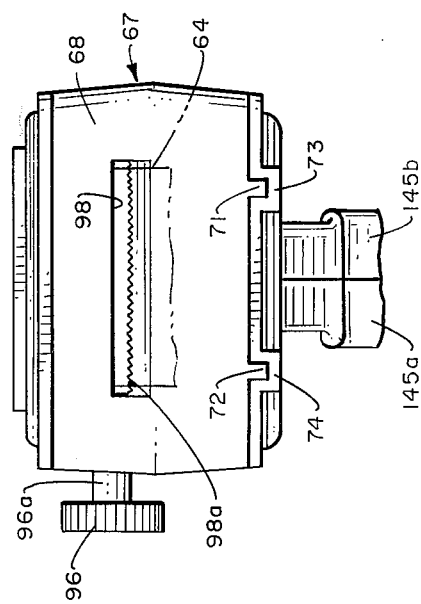
FIG. 4 is an end elevational view along line 4—4 of FIG. 2 illustrating the cartridge.

Referring to FIGS. 3 and 4, a removable paper-roll cartridge 67 has a back panel 68 which closes the end of the casing 20 when the cartridge is inserted as illustrated in FIG. 3. The cartridge also has a lower panel 70 on which are located track means comprising two longitudinal tracks 71 and 72 which enter two track guide means (grooves) 73 and 74, respectively, in bottom panel 22f when the cartridge is shoved into the open end of the casing. The bottom panel 70 of the cartridge has secured thereto a leaf spring 76 having a bent portion 76a which drops beyond the raised rear edge 77 of the bottom panel of casing section 22 when the cartridge 67 is fully inserted (see FIG. 3). Thus, the portion 76a serves to normally hold the cartridge within the casing but permits the cartridge to be pulled outwardly by sufficient force. Spring 76 is secured to bottom panel 70 by a plurality of screws 76b.

Figure 6:
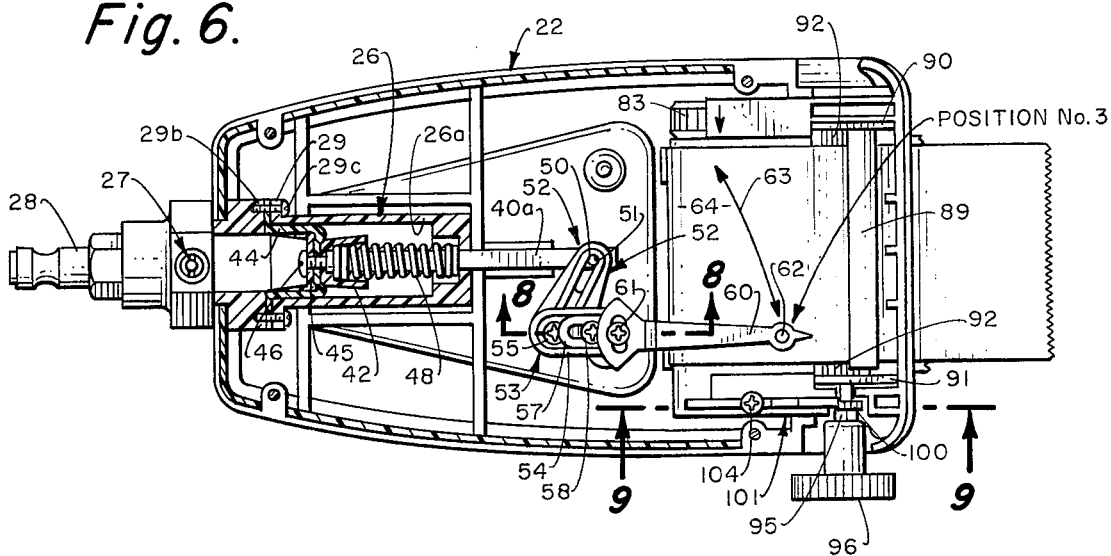
FIG. 6 is a section similar to FIG. 5 showing the indicator arm in the maximum pressure position.
Figure 7:
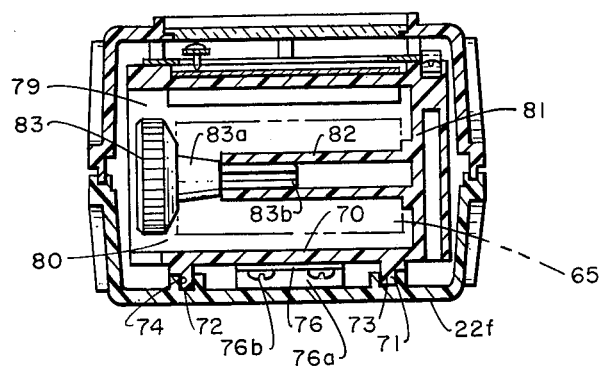
FIG. 7 is a transverse vertical section along line 7—7 of FIG. 5 illustrating the mounting structure in the cartridge for the paper roll.

Directly above the bottom panel 70 of the cartridge is located a compartment 80 which has a back wall 79 and a side wall 81 from which a tubular projection 82 projects into the compartment 80 (see FIG. 7). The roll of recording paper 65 has an opening for receiving tube 82 and a knob 83 has a conical portion 83a connecting with tube end 83b. After the roll is placed on tube 82, the end 83b is inserted in the tube and the conical portion is forced against the opening in the tube in order to move the paper roll with knob 83. As the recording paper unwinds from the roll 65, it first passes around the top rolled edge 86 of the compartment 80 and then passes over the top platform 87 of the compartment where paper section 64 is engaged by the marking pin 62. The paper then passes over the rear edge 87a of platform 87 and down past a rubber roller 89 (see FIG. 6) which is pivotly mounted at opposite ends on steel plates 90 and 91. A serrated drive shaft 92 is separated from roller 89 by a space permitting the passage of paper 64 (see FIGS. 3 & 5). One end of the serrated member 92 is located in plate 90 and the other end is located in plate 91 and the other end has a shaft 95 (see FIG. 5) projecting from reduced end 96a of knob 96. Rotation of the knob 96 causes the paper 64 to move downwardly through the slot 98 in the back end wall of the cartridge. The lower edge 98a of the opening has a serration to facilitate tearing off of the paper 64 at its exit from the casing (see FIG. 4).

Figure 2:
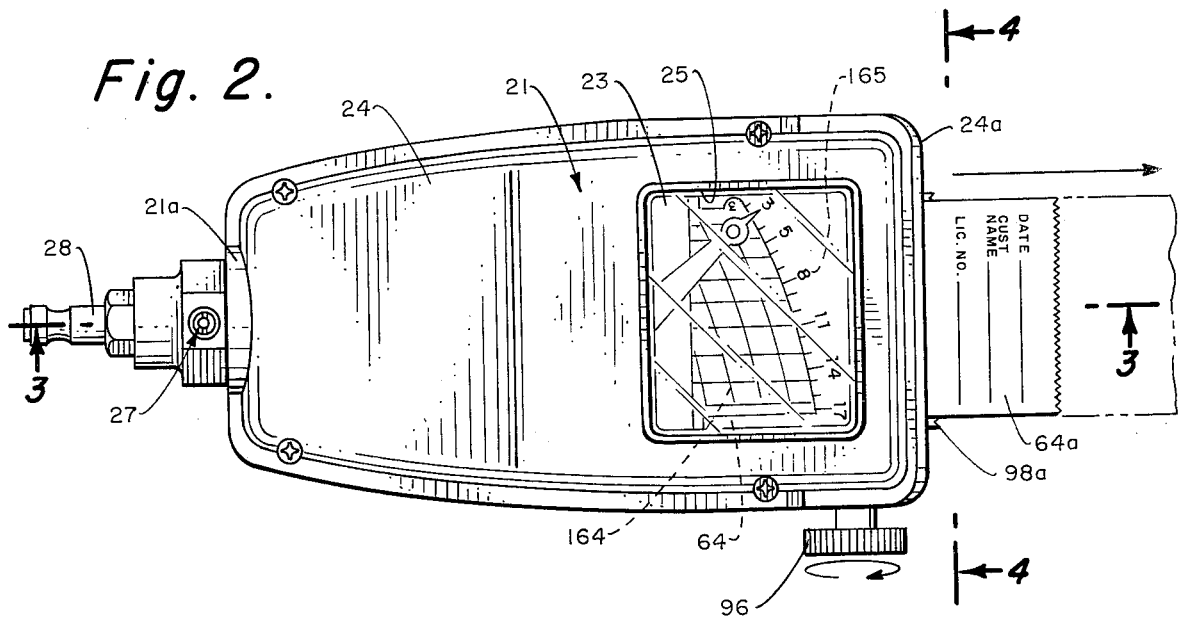
FIG. 2 is a top plan view along line 2—2 of FIG. 1 showing the indicator arm located over the lines on the recording paper.

When the cartridge is first installed, the paper can be fed through between roller 89 and member 92 by being unwound from the roll 65 and thereafter rotation of the knob 96 causes the paper to move along the platform 87 until it reaches the desired location so that the indicies on the paper are at the proper position for being marked by the pointer 62 as illustrated in FIG. 2. As illustrated in FIG. 7, the knob and its shaft are located in one of the side recesses in the casing.

Figure 9:
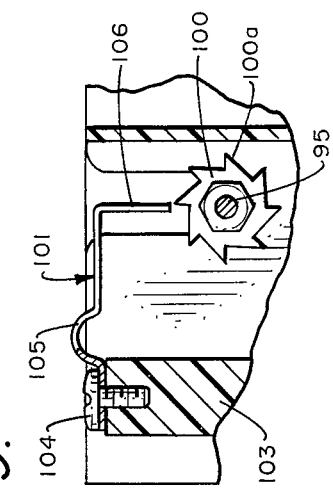
FIG. 9 is a vertical section along line 9—9 of FIG. 6 showing the ratchet mechanism for the paper roll.

Reverse movement of the paper is prevented by the ratchet wheel 100 which is connected to the shaft 95 for the knob 96 (see FIG. 9). A ratchet spring arm 101 has one end secured to a cartridge post 103 by means of a screw 104 and contains a spring loop 105 and a downward projecting end 106. The teeth 100a of the ratchet wheel 100 during clockwise rotation causes the arm 106 to rise upwardly to permit movement of the paper but after each tooth passes, the arm 106 drops behind the tooth so that the serrated rod 92 cannot rotate in the reverse counterclockwise direction to loosen the paper on panel 87 below the indicator pin 62.

The fitting 28 at the end of the casing receives the coupling 110 which consists of a sleeve 111 containing a plurality of openings 112 to receive ball bearings 113. The sleeve is threaded onto an end of member 114 which is larger then the sleeve to provide a flange 115. On the exterior of the sleeve 111 is slidably mounted a lock sleeve 116 which is spring biased towards the end flange 111a of the sleeve 111 by means of a spring 117 which has one end bearing against the flange 115 and the other end bearing against flange 116a within the sleeve 116. Also, a cutout 116b is located at the end of sleeve 116 to receive the balls 113 when the sleeve 116 is retracted against the spring. Thus, the member 110 can be placed over the fitting 28 and the sleeve 116 can retain the balls in groove 28a of the fitting in order to lock the member 110 to the fitting 28.

When it is desired to loosen the fitting 28, the sleeve 116 is moved until the balls can enter cutout 116b and leave the groove 28a. The tube 120 connecting to the spark plug opening of the cylinder is attached to the member 114 and communicates pressure to the cylinder 26. The member 114 has an end partition 121 which contains an opening 122 for a plug valve 123 having an opening 124 which is closed when flange 123a of the plug valve 123 is pushed against the partition 121 by spring 125. However, when the fitting 28 is inserted into the member 110, it engages the valve 123 and pushes it towards the spring 125 until the opening 124 is in communication with the interior passage 28b leading to cylinder 26. The relief valve 27 consists of an end member 126 which is threaded into an opening in portion 26c. An enlarged opening 126a in member 126 receives valve stem 127 which mounts a seal 128 for opening 126a. A circular casing 129 has a flange interlock with member 126 and terminates in a sharp end 129a. Coil spring 130 extends between seal 128 and a flange 129b adjacent end 129a and normally holds a rubber seal 131 on stem 127 against the end 129a. The seal 131 is retained in a housing 132 attached to the stem and the seal is located in the passage 133 leading to the measuring cylinder 26. Thus, when the stem 127 is normally depressed, all the air in the cylinder 26 can escape to atmosphere and the piston head 42 can return to its initial position illustrated in FIG. 5.

The other end of the tube 120 connects with an end fitting 134 which is threaded into an opening in a handle 135. The end opening 134a in the fitting contains a check valve 140 of the same construction as relief valve 27. However, in this case, the valve acts to retain the pressure developed by each stroke of the piston in the line 120 and chamber 26. The line pressure acts against seal 131 and the seal can only be broken by a greater pressure applied at the stem end. A probe 136 extends transversely of the handle 135 and is threaded into an opening therein so that passage 136a is in communication with passage 135a, the end of passage 135a being closed by plug 137. The end of probe 136 is covered with somewhat flexible head 138 which is tapered at section 138a so that it can be tightly inserted into the opening in the cylinder head from which the spark plug has been removed.

In operation of the device, the spark plug from the cylinder is removed and the head 138a of the probe tube leading to the pressure measuring cylinder 26 is inserted tightly within the spark-plug hole. Thereafter, to produce a pressure in line 120, it is necessary to turn over the crankshaft of the engine in order to stroke the piston in the cylinder through the compression stroke. In order to accomplish this movement of the crankshaft, the meter casing 20 has attached thereto a pistol grip 145 which contains a switch which can be finger actuated to turn over the engine with the starter. The pistol grip 145 is formed in two sections 145a and 145b which are identical in shape and the sections are held together by screws 146, each passing through section 145a into a stud 147 in section 145b (see FIGS. 1 and 3). The sections are also held in alignment by a plurality of pins 148 inserted into projections 149. The top surface 150 of each handle section is secured by screws 152 in a recess 151 in bottom panel 22f of casing section 22. The adjoining edges of the two sections 145a and 145b have cutouts forming opening 153 which receives a switch button 154. A microswitch 155 is secured to the section 145b by means of screws 156 and spring switch arm 157 is secured at end 157a to the casing of switch 155. The other end of the switch arm 157 is located opposite a projection 158 on the button 154 and arm 157 biases the button to its outer position where flanges 154a engage the edge of the openings 153. When the button 154 is pushed inwardly by the finger of the hand which surrounds the piston grip, the switch arm 157 flexes and actuates the switch button 159 to close the switch. The switch actuates the engine starter 162 through lines 160 and 161 to turn over the crankshaft causing one piston at a time to move through top dead center of the compression stroke to develop a compression pressure within the combustion chamber.

During the first compression stroke of the piston, a first pressure pulse passes into line 120 and into the measuring cylinder 26. This first pulse moves the pin 62 a first increment on the recording paper 64 as indicated by Position 1 in FIG. 5. After each compression stroke, the check valve 140 retains the pressure in the line and cylinder. The next compression stroke will move the pin 62 a second increment on the paper 64. The pressure resulting from the second stroke will increase the pressure in the line by the increment between Positions 1 and 2 in FIG. 5. Finally, a third stroke of the piston through the top dead center of the compression stroke will add a third increment of pressure and cause the pin 62 to move to Position 3 as shown in FIG. 6. The total pressure is held in the line and cylinder by the check valve 140, and the movement of pin 62 has traced a path 63 across the recording paper. The pressure can be released prior to the testing of the next cylinder by manually operating relief valve 27 by pushing down on stem 127.

As illustrated in FIG. 2, recording paper 64 has transverse lines 164 associated with a scale 165 which is fixed to the casing by posts 166. The position of the pin 62 on the lines will indicate to the operator a certain level of pressure ($Kg/Cm^2$) developed by the three compression strokes of the piston and, of course, the scale could read in pounds per square inch. It is understood that additional strokes of the piston could produce a somewhat higher pressure in the cylinder 26 but it is preferred that the pressure reading by standarized for three strokes. Typically, the first stroke could produce a reading of 60 pounds per square inch, the next stroke a reading of 85 pounds per square inch and the third stroke a reading of 110 pounds per square inch. Ahead of each recording section on the recording paper there is provided a section 64a for information concerning the particular test and engine. Thus, the paper carries the necessary indicies to later identify the particular test and the results.

After a cylinder is tested, the paper 64 is rolled out of the instrument to place a new portion of the paper under pin 62 so that a second curve adjacent the first curve will be produced during three strokes of the second piston and the curve can be directly compared with that for the first cylinder. After obtaining a curve for each of the cylinders of the engine, the paper 64 can be torn off at the end of the instrument and it is possible to compare the compression condition of all of the cylinders with one another. If the rings in one or more of the cylinders are bad, it will show up by a comparison of the curves.

As the paper is rolled forward, a new designation of date and customer will appear followed by the scales on which the readings for the various cylinders of the next engine will be made. After the testing of each of the cylinders of the engine, the relief valve 27 will be actuated to relieve the pressure in the line 120 and the cylinder 26 so that the indicator arm will start from the zero position prior to the first compression stroke of the cylinder being tested. Each stroke of the piston is under the control of the finger actuated switch 155 which energizes the starter to turn over the engine so that with a single instrument, the operator not only has in his hands the pressure measuring and recording device, but also control for the movement of the engine crankshaft. By making the paper cartridge 67 removable from the casing, it is apparent that new roll 65 of recording paper can be easily added when a roll is depleted.

What is claimed is:

1. In a meter for testing the compression pressure developed by an engine piston in an engine cylinder, the pressure being transmitted by a tube to a measuring cylinder from the spark-plug hole of the engine cylinder and a measuring piston located within the measuring cylinder to move an indicator in response to compression pressure; the improvement comprising:
    a casing containing said measuring cylinder and being open at the one end;
    a removable cartridge insertable into said casing at said open end and containing a roll of recording paper;
    a platform on said cartridge over which said paper passes when unrolled from said roll; and
    marking means on said indicator located opposite said platform and movable across said recording paper on said platform in order to indicate increase in compression pressure in said measuring cylinder with successive strokes of said engine piston.

2. In a meter as defined in claim 1:
    an opening in said cartridge through which said paper is discharged from said cartridge after being marked by said marking means.

3. In a meter as defined in claim 1:
    a top panel for said casing containing an opening for observing the movement of said marking means over said recording paper.

4. In a meter as defined in claim 1:
    a bottom panel for said casing;
    handle means connected to said bottom panel;
    a switch located within said handle;
    a switch button extending through said handle in position to be engaged by the finger of the hand holding said meter; and
    means for connecting said switch to the engine starter.

5. In a meter as defined in claim 1:
    a check valve in said transmitting tube for holding pressure developed by stroking of said engine piston in order to obtain a reading from said meter.

6. In a meter as defined in claim 1:
    a relief valve for relieving the pressure in said measuring cylinder after completion of the test of an engine cylinder.

7. In a meter as defined in claim 1:
    track means on said cartridge and guide means on said casing for receiving said track means for guiding said cartridge into and out of said casing.

8. In a meter as defined in claim 7:
    said casing having sides, said sides being recessed at said one casing end;
    a knob on said cartridge for moving said paper over said platform, said knob being located in one of said recesses when said cartridge is in said casing.

9. In a meter as defined in claim 2:
    a back wall for said cartridge;
    said opening being a slot in said back wall;
    the lower edge of said slot being serrated to facilitate tearing off said paper adjacent said cartridge after measurements on the cylinders of an engine.

10. In a meter as defined in claim 7:
    a leaf spring attached to said cartridge, said spring having an enlargment for engaging a raised edge of said casing adjacent said open end to restrain the cartridge within said casing with the spring force.

11. In a meter as defined in claim 1:
    recording indicies on said recording paper for indicating the value of compression pressure developed by each stroke of said engine cylinder and for designating the engine being tester.

12. In a meter as defined in claim 1:
    a roll diaphragm for sealing between the measuring piston and the measuring cylinder.

* * * * *